United States Patent [19]
Schmidt

[11] 3,831,438
[45] Aug. 27, 1974

[54] APPARATUS FOR TESTING THE BENDING STRENGTH OF ELASTIC MATERIALS

[76] Inventor: Karin Schmidt, Chicago 5, 2421 Kittsee, Austria

[22] Filed: Aug. 18, 1972

[21] Appl. No.: 281,961

[30] Foreign Application Priority Data
Aug. 26, 1971 Austria.............................. 7461/71

[52] U.S. Cl...................................... 73/100, 73/91
[51] Int. Cl. ............................................ G01n 3/32
[58] Field of Search................................ 73/100, 91

[56] References Cited
UNITED STATES PATENTS
3,031,886  5/1962  Larsson et al. .................... 73/100 X
3,324,714  6/1967  Simon et al. .......................... 73/100

*Primary Examiner*—Jerry W. Myracle
*Attorney, Agent, or Firm*—Karl F. Ross; Herbert Dubno

[57] ABSTRACT

Two parallel carrying plates serve to grip workpieces of elastic material and are mounted in crossing guide slots for relative swinging in opposite directions. A bar is provided between the two carrying plates and adapted to be lifted and lowered thereby to support the elastic working at locations to be subjected to bending stress. As the base rises, each workpiece is subjected to increasing pressure by a weighted member bearing upon it at the bend.

8 Claims, 3 Drawing Figures

3,831,438

APPARATUS FOR TESTING THE BENDING STRENGTH OF ELASTIC MATERIALS

My present invention relates to apparatus for testing the bending strength of elastic materials, such as rubber, polyurethane or similar polymers.

In the footwear and textile industries, elastic polymers are used on an increasing scale and are to be subjected to severe bending stresses. Particularly the use of soles of plastic material for shoes requires in the footwear industry a testing of these materials not only as regards their chemical qualities but also as regards their flexibility.

It is an object of the present invention to provide an apparatus in which several workpieces of plastic material to be tested are subjected to a repetitive bending stress and are preferably also placed under compressive stress at the same time. In that case, the number of deformation cycles to which the specimens can be subjected until they break on account of the deformation will then be a useful and comparative value to indicate the quality of the material.

This object of the invention is accomplished by the provision of an apparatus which comprises two parallel carrying plates to which the workpieces of elastic material can be fixed and which have a common pivot and extensions remote from that pivot respectively guided along orthogonally intersecting lines for relative swinging in opposite directions, a bar being provided between the two carrying plates and adapted to be lifted and lowered to support the elastic workpieces at locations to be subjected to bending stress. The bends of the workpieces are under pressure from overlying weighted members, as the bar rises above a certain level during the swing of the plates.

The invention will now be explained more fully with reference to the accompanying drawing in which FIG. 1 is a front elevation showing a testing apparatus according to my invention;

Figure 1:
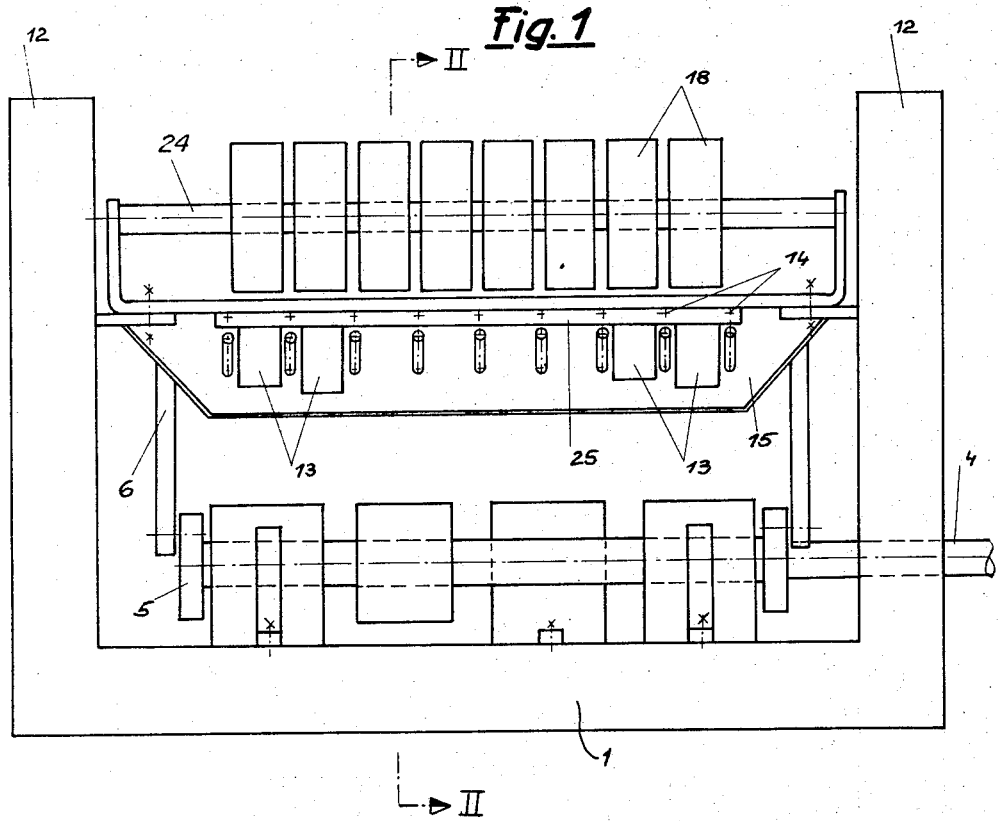
Figure 2:
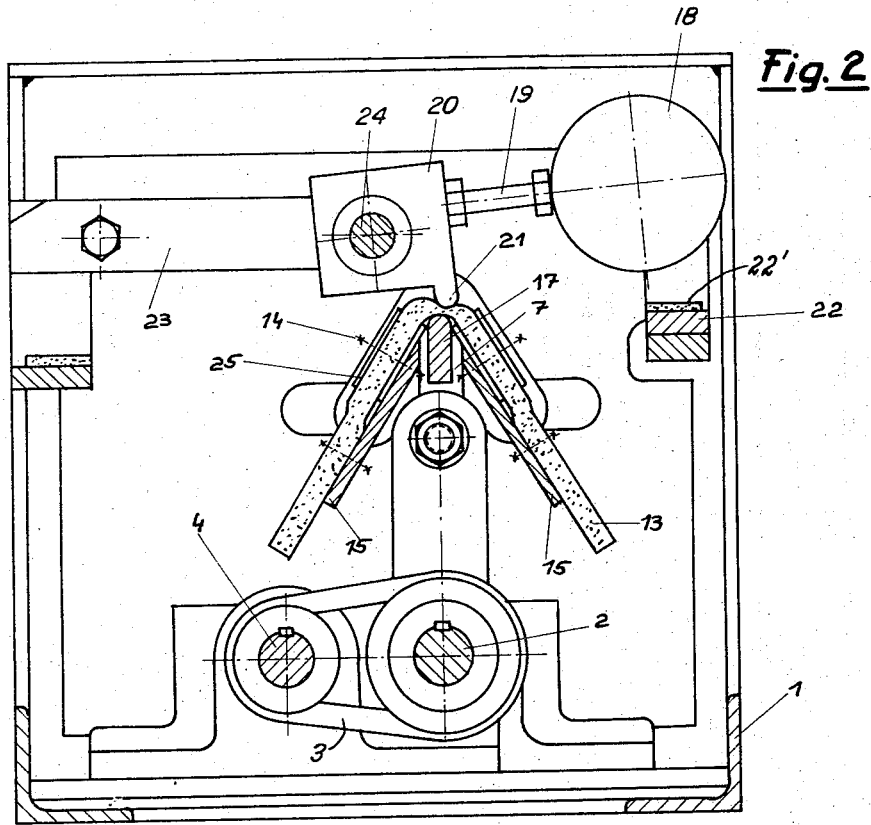
FIG. 2 is a transverse sectional view taken on line II—II OF FIG. 1.
Figure 3:
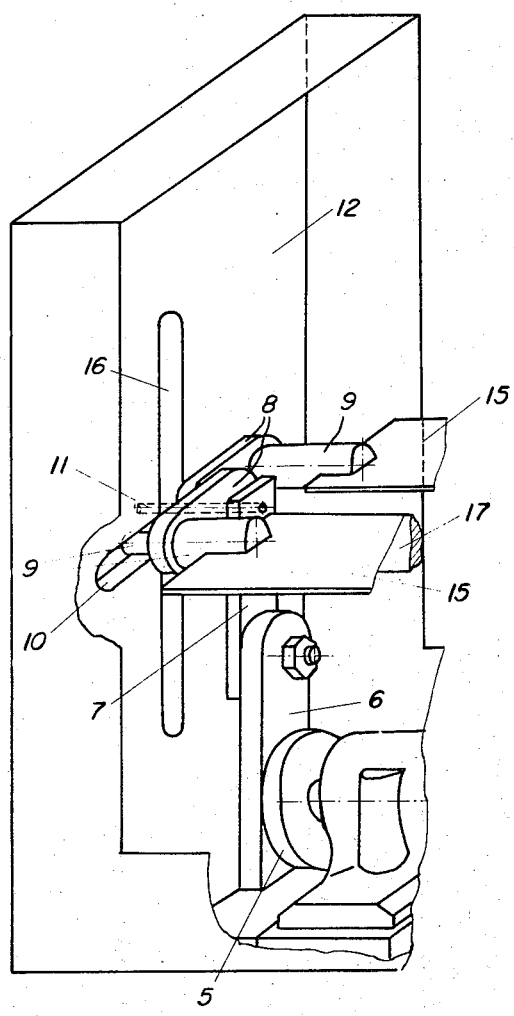
FIG. 3 is a perspective view showing a detail of the crossing guide mechanism of the apparatus of FIGS. 1 and 2.

A drive shaft 2 is rotatably mounted on a base frame 1 and driven by an electric motor, not shown. The rotation of the shaft 2 is transmitted by a V-belt drive 3 to a shaft 4, driving a crank disc 5 which reciprocates a connecting rod 6. A pitman 7 is connected at one end by a screw to rod 6 and is articulated at its opposite end to two transverse links 8 by means of a pivot pin 11. The pin 11 is slidingly guided in a vertical slot 16 of a sidewall 12. The assembly is duplicated at opposite sides of frame 1 as seen in FIG. 1.

The outer end of each link 8 is provided with a bore traversed by a respective slider 9. The outer extremity of each slider 9 is guided in a horizontal slot 10 of sidewall 12. At their end remote from the intersecting guide slots 10, 16 the two sliders 9 are rigidly connected to respective carrying plates 15. The plates 15 support a number of flat, elongate workpieces 13 to be tested and are connected therewith by screws 14. The two pitmans 7 on each frame side are by a bar 17, having a rounded top interconnected edge, about which the specimens workpieces are angularly bent.

The pressure-applying mechanism according to my invention comprises a continuous retaining bar 22, which interconnects the two sidewalls 12 of the machine frame and normally supports a set of weights 18 by an elastic cushioning layer 22'. Each weight 18 is connected by an arm 19 to a block 20, the individual blocks being rotatably mounted on an axle 24. Arms 23 are provided to hold the axle 24 a location laterally offset from the bar 17. Each block 20 is provided with a spur 21 which, when the carrying plates 15 are raised above their normal horizontal position, applies pressure to the workpieces 13 along the axis about which it is bent. Arm 19 acts as a lever, fulcrumed at axle 24, to reduce the effective loading force of weight 18.

The testing apparatus according to my invention has the following mode of operation:

By means of the screws 14, the elastic workpieces 13 are fixed to the carrying plates 15, with clamping strips 25 interposed, whereafter the motor is started. As a result, the two shafts 2 and 4 are rotated and the cam discs 5 drive the connecting rods 6 and the pitmans 7 so that the pins 11, serving as common pivots for the two plates 15, are pushed upwardly in the vertical slots 16 of the frame walls 12 and elevate the deflecting bar 17. At the same time, the sliders 9 mounted in the horizontal guide slots 10 of these walls approach each other so that the two carrying plates 15 and the plates workpieces 13 fixed thereto swing in opposite directions whereby the workpieces 13 are progressively bent. It will be noted that the workpiece-supporting surfaces of the plates 15 converge toward the bending edges of deflecting bar 17 in any position, this edge being substantially in line with the common swing axis of the plates defined by the pivot pin 11.

As soon as the upper surface of each workpiece 13 contacts with its fold line the respective spur 21, the block 20 is turned and the weight 18 is raised off its supporting layer 22' so as to compress the workpiece at its midportion between the spur 21 and the edge of bar 17.

During the downward stroke, the sliders 9 serving as extensions of plates 15 move apart, outwardly in the horizontal guide slots 10 of the walls 12, and the pivot pin 11 slides downwardly in its vertical guide slot 16. Depending on the selected crank disc 5, this stroke may result in a return of the workpieces 13 to their flat horizontal position or in a reverse bending thereof beyond that horizontal position, i.e., beyond a position in which the supporting surfaces of plates 15 are coplanar.

The bending cycles may be repeated until the workpiece breaks. The number of bending cycles required to break the workpiece is a comparative value indicating the bending strength.

Because the apparatus is simple and compact, a relatively large number of strips or other workpieces can be readily tested with it at the same time.

What is claimed is:

1. An apparatus for testing the bending strength of flat, elongate elastic workpieces, comprising a deflecting element with a horizontal edge, a pair of carriers oppositely swingable about a common pivotal axis substantially in line with said edge, said carriers being provided with workpiece-supporting surfaces converging at said edge, fastening means for securing a workpiece to said surfaces with the midportion of the workpiece overlying said edge, and drive means for relatively swinging said carriers in opposite directions about said axis whereby the workpiece is bent about said edge.

2. An apparatus as defined in claim 1 wherein said drive means includes vertical guide means for said deflecting element and horizontal guide means for extensions of said carriers remote from said axis, said extensions being reciprocable toward each other along said horizontal guide means for relatively inclining said surfaces with concurrent elevation of said deflecting element.

3. An apparatus as defined in claim 8 wherein said drive means comprises a vertically reciprocable rod and a pair of transverse links articulated to said rod, said links having outer ends engaging said extensions.

4. An apparatus as defined in claim 2, further comprising pressure means overlying said deflecting element for compressing the midportion of a workpiece against said edge upon elevation of said deflecting element above a normal position in which said surfaces are substantially coplanar.

5. An apparatus as defined in claim 4 wherein said pressure means comprises a weighted element and support means absorbing the weight of said element in said normal position.

6. An apparatus as defined in claim 5 wherein said pressure means further comprises a lever with a fulcrum laterally offset from said pivotal axis and with a weight on a free end of said lever, said element being mounted on said lever between said fulcrum and said free end.

7. An apparatus as defined in claim 4 wherein said deflecting element is a horizontal bar and said carriers are a pair of plates flanking said bar, said pressure means comprising a plurality of weighted elements spaced along said bar for engagement with respective workpieces juxtaposed on said plates.

8. An apparatus as defined in claim 7 wherein said pressure means further comprises support means common to all said weighted elements for absorbing the weight thereof in said normal position.

* * * * *